United States Patent Office 3,155,999
Patented Nov. 10, 1964

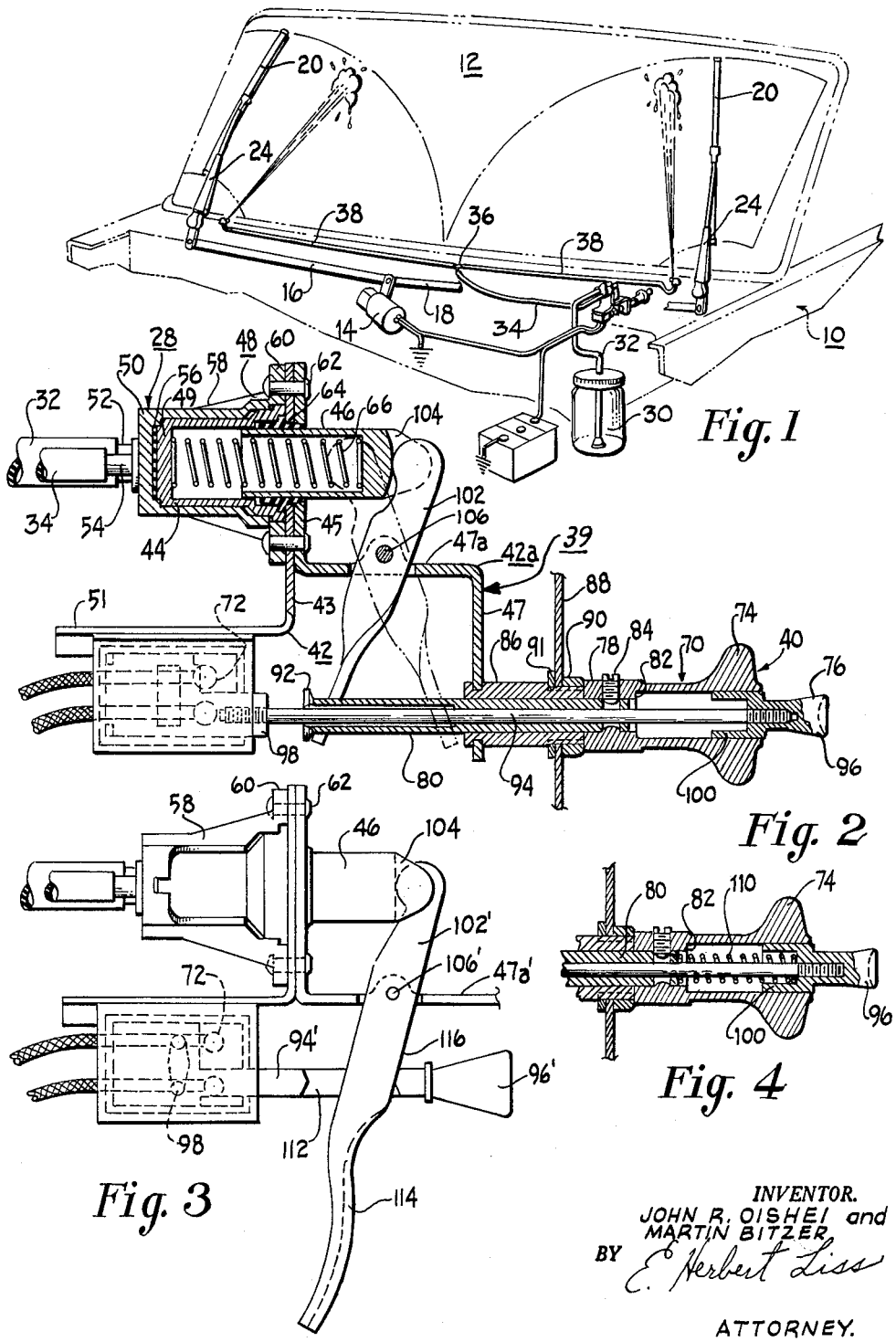

3,155,999
WINDSHIELD CLEANER
John R. Oishei, 14 Queen Ann's Gate, Buffalo, N.Y., and Martin Bitzer, 150 Highland Parkway, Kenmore 23, N.Y.
Filed Apr. 1, 1963, Ser. No. 269,654
16 Claims. (Cl. 15—250.02)

The present invention relates to motor controls for windshield wiper systems and, more particularly, to a motor control incorporating a servo-mechanism for supplying solvent conjointly with wiper operation.

An operator actuated unitized servo-system is contemplated wherein a single servo-control assembly serves the dual purpose of energizing an electric motor driven wiper or a fluid pressure operated wiper motor while simultaneously actuating a servo system including a cylinder and low displacement piston pumping mechanism incorporated in the control unit. The pump may be designed to deliver single increments of approximately ten percent of the volume of solvent delivered by prior art structures and at higher pressures than known heretofore in such devices. The solvent is ejected into the path of and preceding the movement of the wiper blade.

Presently known devices designed for coordinated or semi-coordinated operation of washer pumps with wiper systems generally require complex mechanisms involving numerous parts including a high torque or high speed motorized pump. The devices now in use, because of their complexity resulting in substantial cost, are limited to optional equipment for motor vehicles. It would be, of course, desirable for effectively improving highway safety to provide a wiper-washer system on every vehicle.

These presently known devices wastefully deliver an excessive amount of solvent with each cycle of operation in quantities far beyond the need for satisfactory clearing of the glass. Excessive projection of solvent results in frequent need for refilling of the reservoir and loss of use of the washer at frequent intervals because of solvent depletion. Furthermore, in the prior art devices a substantial time lapse is required for recharging the pump. The servo-mechanism disclosed herein results in effective delivery of the proper amount of solvent to meet varying road, traffic and weather conditions by means of a single or repeated impulses at proper operator selected intervals and at sufficient operator controlled pressure to overcome wind stream solvent dissipation; it further results in a pump capable of substantially instantaneous pump recharging to render it immediately available for repeated impulses.

The principal object of the invention is to provide a unitized operator actuated servo-system for conjoint wiper-washer action which utilizes a unitized control and a servo-mechanism including a cylinder and a low displacement pumping element incorporated in the control for delivering solvent to a windshield in the path of and preceding the wiper blade, which servo-mechanism is of simple and economical construction utilizing a minimum number of parts.

Another object of the invention is to provide a unitized servo-system of simple and economical construction to provide operator controlled pressure and volume delivery of solvent in manually controlled repeated increments of low volume and relatively high pressure which is capable of substantially instantaneous recharging.

A further object of this invention is to provide a simple and economical servo-mechanism for conjoint wiper-washer operation including in a unitized assembly a manually actuated servo-control and a low displacement high pressure pump for operator selected and actuated repeated fluid delivery, which fluid delivery is variable in volume and pressure by operator control to economically eject sufficient solvent required to clean the windshield under varying road, traffic and weather conditions.

A still further object of the invention is to provide a servo-mechanism for a windshield wiper and washer which comprises in a unitized assembly a servo-control and a low displacement high volume pump, together with force multiplying means for minimizing operator effort.

Other objects and advantages of the invention will be apparent from the following detailed description taken in connection with the accompanying drawings in which:

FIG. 1 is a fragmentary perspective view of an automotive vehicle incorporating the improved windshield cleaning servo-system of the present invention;

FIG. 2 is a longitudinal cross section view of the unitized control and pump unit of this invention;

FIG. 3 is a side elevational view of a modified type of control and pump unit; and FIG. 4 is a partial longitudinal cross section view of a modified form of the control.

Briefly, there is disclosed herein a unitized servo-system which includes a servo-mechanism or washer pump and a unitary washer-wiper control mounted on a unitary bracket. The servo-mechanism disclosed is a low displacement, high pressure reciprocating piston type pump which is charged by a spring bias and which ejects solvent in response to manual actuation of the control. The pump actuator includes a hollow stem having a flanged inner end. The wiper motor actuator is axially movable within the hollow stem and has a contactor at its inner end for closing the circuit to an electric wiper motor. Although the invention is illustrated and described for use with an electric motor, it will of course be understood that a fluid pressure motor may be utilized and that the motor actuator may operate a throttle therefor. A force transmitting lever which may be arranged to act as a force multiplying lever is fulcrumed intermediate the washer control and the pump piston; it operatively interconnects the washer control with the pump piston. The pump actuator includes a portion having a reduced inner diameter forming a shoulder for engaging a peripheral abutment on the wiper actuator. The shoulder portion of the pump actuator is spaced from the peripheral abutment of the wiper actuator. Thus, the washer actuator moves a distance equal to the space between the reduced diameter portion and the abutment on the wiper actuator before actuation of the wiper is initiated. The spring in the pump cylinder which biases the piston outwardly to recharge the pump transmits force through the interconnecting fulcrum lever to return the pump actuator to its initial position. Since the pump actuator and the wiper actuator are slidable relative to each other, the wiper actuator remains in motor energizing position when the washer actuator is returned to its initial position. Manual axial movement of the wiper actuator is required to deenergize the wiper motor. It will, of course, be apparent that the wiper actuator may be operated independently of the washer actuator.

In another form of the invention, a spring is disposed coaxially with the wiper actuator in the space between the shoulder portion of the washer actuator and the peripheral abutment on the wiper actuator. This provides reduced delay between washer actuation and wiper actuation.

In another embodiment of the invention, the lever interconnecting the piston and the unitary control has an integral operating handle thereon. This lever intersects the wiper actuator and during its outward movement engages a shoulder on the wiper actuator to provide conjoint movement.

In FIG. 1 an automotive vehicle 10 is shown having a windshield 12 mounted thereon. A wiper motor 14 is suitably mounted on the vehicle fire wall and is adapted to drive links 16 and 18 which are coupled to windshield wiper blades 20 through rocker arms 22 mounted on rockshafts (not shown) which in turn mount wiper arms 24. As is well understood in the art, whenever a wiper motor 14 is placed in operation, wiper blades 20 will oscillate back and forth across windshield 12.

A washer system is employed in conjunction with the wiper system for clearing dirt sprayed windshields by delivering solvent thereto. This system includes a pair of delivery nozzles 26 through which fluid is projected to windshield 12 by pump or servo-mechanism 28 from reservoir 30 through a conduit 32 from the reservoir to the pump, a conduit 34 from the pump to a T 36 and a pair of conduits 38 connecting the T 36 to the delivery nozzles 26.

A servo-system 39 including a unitary wiper motor and washer pump or servo-control 40 and a low volume, low displacement, high pressure pump or servo-mechanism 28 are mounted on a unitized bracket 42; the control knobs of the combined control 40 project through the dash panel to a point within convenient reach of the driver of the vehicle.

The servo-system 39 can best be seen in FIG. 2. An angle bracket 42 has mounted on one leg thereof cylinder 44 of pump 28. Cylinder or pump chamber 44 is held in position on angle bracket 42 by cylinder bracket 48. Cylinder bracket 48 includes an end cap 50 having an inlet nozzle 52 and an outlet nozzle 54 projecting outwardly therefrom. The inner surface of cap 50 receives the outer end of cylinder 48 in complementary mating relationship. Nozzles 52 and 54 communicate with cylinder inlet and outlet openings (not shown), respectively. The intake nozzle 52 is connected through conduit 32 to reservoir 30 and the outlet nozzle 52 is connected through conduit 34 to T 36. A check valve 56 is disposed intermediate the end wall 49 of cylinder 44 and the cap 50. A pair of legs 58 depend from end cap 50 of cylinder bracket 48 and have ears 60 at their free ends for mounting on legs 43 of angle bracket 42.

A section 42a of bracket 42 includes a leg 45 which is substantially co-extensive and lies in juxtaposition with leg 43. The legs 43 and 45 of angle bracket 42 have aligned openings co-axial with the cylinder 44. The ears 60 of cylinder bracket 48 are fastened to the legs 43 and 45 of the angle bracket 42 in any suitable manner as, for example, by rivets 62, thus retaining the cylinder 44 in position on the bracket 42.

The cylinder or pump chamber 44 defines a solvent chamber in which a low displacement, fluid displacing element or pumping element, as for example, piston 46, is adapted to reciprocate. A gland seal 64 is disposed intermediate the inner periphery of cylinder 44 and the outer periphery of piston 46 and has an extension 65 extending into the aligned openings in legs 43 and 45 of angle bracket 42. Suitable biasing means, as for example, a compression spring 66, is disposed intermediate the end wall 49 of cylinder or pump chamber 44 and the piston or fluid displacing element 46 to bias the piston 46 outwardly of the cylinder thereby activating the check valve 56 to permit solvent to enter through nozzle 52 and the inlet opening of cylinder 44 to charge the cylinder.

A manually operable unitary combined wiper motor control and pump control 40 is mounted on a leg 47 of angle bracket 42a. The leg is longitudinally spaced from and projects in generally opposite direction from the legs 43 and 45. Angle bracket 42 includes a leg 51 projecting perpendicularly from the leg 43 and has mounted thereon a stationary contact 72 of a motor contactor.

The unitized servo-control 40 includes a pump or servo-actuator 74 constituting a pumping element actuator or fluid displacing element actuator and wiper motor actuator 76. The pump actuator comprises a tubular control knob section 78 having a reduced inner diameter at one end of a size to receive in complementary relationship a tubular pumping element actuating section 80 therein.

The pump control knob section 78 is provided with an increased inner diameter portion which extends to the outer end of the knob and forms a radially inward extending, outwardly facing shoulder 82 at its junction with the section having a reduced inner diameter. The tubular pump actuating section 80 has one end portion thereof received within the reduced inner diameter of the pump control knob section 78 and may be secured therein by any suitable means as, for example, a set screw 84 as shown. The remainder of the actuating section 80 is slidably received within a bushing 86. The bushing 86 is rigidly mounted adjacent the free end of leg 47 of mounting bracket section 42a by any suitable means. A reduced outer diameter portion of the bushing 86 may be received in an opening in the dash panel 88 and secured thereto by any suitable means as by a threaded nut 90 and washer 91. The actuating section 80 has at its free end remote from the control knob section 78 a radially extending peripheral flange 92.

Telescopically received within the servo-actuator 74 coaxially therewith and slidable therein is the wiper motor actuator which comprises an actuator rod 94 and a manual knob 96 threadably received thereon at the outer end. At the inner end of rod 94 there is secured movable contactor 98 slidably received within the housing of the stationary contactor 72 for movement therein to open or close the motor switch. The stationary contactor may be provided with a plurality of sets of contacts for connecting the wiper motor to operate at one of a plurality of speeds. The knob 96 has secured thereto an axially extending peripheral flange 100 which extends into the enlarged diameter portion of the pump control knob section 78.

A force transmitting lever 102 is pivotally connected at one end to a lug 104 on the outer end of the piston 46. A leg 47a of mounting bracket section 42a connects leg 45 and leg 47. The lever 102 is pivoted intermediate its ends by a transversely extending pin 106 which is secured to the leg 47a of the mounting bracket section 42a in any suitable manner. The pin 106 forms a fulcrum for the lever 102. The other end of the lever 102 is bifurcated and the bifurcation straddles the actuating section 80 of the pump actuator 74 and is adapted to be engaged by the flange 92 whereby axial movement of the pump actuator is transmitted to the lever 102 through its engagement with the flange 92, resulting in axial movement of the piston 46. In accordance with the broader aspects of the invention, the fulcrum 106 may be disposed at any point intermediate the ends of the lever 102 and, if desired, may be disposed closer to the end pivoted to the lug 104 to serve as a force multiplying lever.

The operation of the cleaning system herein disclosed should now be apparent. When an axial force is applied to the control knob section 78 to pull it outwardly (to the right as seen in FIG. 2), the force is transmitted through lever 102 (which moves to the broken line position in FIG. 2) thence to the piston 46, driving the piston inwardly (to the left as seen in FIG. 2) thereby compressing spring 66 and ejecting fluid from the cylinder 44 through the check valve 56 which operates in a well known manner to open nozzle 52 when the piston moves inwardly. The fluid passes through conduit 34, T 36 and conduits 38 to nozzles 26 and is delivered to the windshield. When the shoulder 82 engages the flange or abutment 100, the rod 94 is moved axially outward. This action causes movable contacts 98 to move to "motor on" position and to initiate wiper action. It can thus be seen that there is some delay between ejection of the solvent and initiation of wiper motor operation. Thus the operator will become aware before initiating wiper motor operation that solvent is not available and can release the pump actuator control knob to prevent operation of the wiper on a dry windshield and to thereby prevent windshield smear. The spring 66 offers sufficient resistance to moderate the force applied to the pump thereby preventing over-spray. When the pump actuator is released, the compressed spring 66 will return the piston 46 to its outward position, cause the check valve to open intake nozzle 52 in a well known manner and recharge the pump. The motion of the piston 46 will be transmitted through lever 102 to pump actuator 74, thereby resetting the pump actuator to its initial position. The lever will assume the full line position as seen in FIG. 2. If the pump actuator has been moved to its extreme outward position, the lever 102 will assume the position seen in broken lines in FIG. 2 and the motor actuator will have been moved to its "on" position. An axial force inward (to the left as seen in FIG. 2) on the wiper motor actuator 76 will disengage the contacts 72 and 98 to interrupt wiper motor operation. It can be seen that when the pump actuator has been operated to provide an initial increment of solvent to the windshield, the wiper motor actuator remains in "on" position. When the cleaning apparatus is in this condition, the washer actuator 74 can be operated independently of the wiper motor actuator to provide additional increments of solvent to the windshield in accordance with the need for additional solvent. It can be further seen that the wiper motor actuator may be operated independently of the pump actuator to provide independent wiper operation.

A modification of the embodiment described above with reference to FIG. 2 is illustrated in FIG. 4 and is substantially identical with the FIG. 2 embodiment, but includes an additional compression spring 110 to provide more rapid initiation of wiper motor operation when the pump actuator is operated. The compression spring 110 is received on the rod 94 intermediate the end of the tubular actuating section 80 and the wiper motor control knob 96. Thus, the motion of the tubular control knob section is transmitted to the wiper motor actuator through the spring 110 prior to engagement of shoulder 82 with flange 100.

Another embodiment is shown in FIG. 3. In this embodiment of the invention, the pump structure is identical to the embodiment shown in FIG. 2 and for purposes of brevity will not be again described. In FIG. 3 a lever 102' is pivoted to lug 104 of piston 46 and is fulcrumed at 106' on leg 47a intermediate its ends. A wiper motor actuator rod 94' has a knob 96' secured to one end and a movable wiper motor switch contactor 98' secured to its other end. The lever 102' intersects the wiper motor actuator rod 94' and is received in a recess 112 in the rod 94'. The lever 102' has a handle 114 at its free end. When the handle 114 is moved to the right, as seen in FIG. 3, or outwardly, it engages a shoulder 116 formed at the end of the recess 112 and transmits axial motion outwardly to the wiper motor actuator rod 94', thereby moving the movable contact 98' into "motor on" position to initiate motor action and also applies an inward force to the piston 46, causing it to eject fluid. The recess 112 is of such dimension as to permit the handle 114 to be returned or reset by the pump spring 66 through lever 102' without returning the wiper motor actuator to its "off" position. This recess 112 also permits independent actuation of the wiper motor actuator rod 94'.

It should now be apparent that a unique windshield cleaning servo-system has been shown and described which utilizes a hand operated servo-control having a low displacement, high pressure pump combined therewith for providing conjoint wiper-washer operation and for providing independent wiper motor operation. It also provides means for permitting additional increments of solvent to be applied to the windshield at operator controlled intervals. The invention provides for push-pull axial movement for both conjoint operation, independent wiper operation, and independent washer operation. It provides means for automatic recharging of the pump, automatic resetting of the pump actuator, and force moderating means.

Certain specific embodiments of the invention have been described for the purpose of illustration, but it will be apparent that in its broader aspects, various modifications and other embodiments are possible within the scope of the invention. For example, in accordance with the broader aspects of the invention, other and different reciprocating low displacement, high pressure piston pumps may be employed; the pump spring may be omitted and a spring provided to drive the lever rather than the piston, and other and different types of contactors may be employed. Furthermore, the contactor may be replaced by valve means for operating fluid pressure motors rather than electric motors. It is to be understood, therefore, that the invention is not limited to the specific arrangement shown, but in its broadest aspects, it includes all equivalent embodiments and modifications which come within the scope of the invention.

What is claimed is:

1. In a windshield cleaning system including a wiping element and a connected motor and including washer apparatus having a delivery nozzle; a servo-system comprising a low displacement pump constituting a servo-mechanism for delivering fluid through said nozzle and a unitized control combined therewith, said unitized control including a servo-actuator and a motor actuator, means for manually actuating said servo-actuator and said motor actuator conjointly with a single mode of movement to eject a single measured increment of fluid through said nozzle at operator controlled pressure and to energize said motor, dual function means for automatically resetting said servo-actuator and recharging said pump and means for manually actuating said motor actuator independently of said servo-actuator to energize or deenergize said motor.

2. In a windshield cleaning system including a wiping element and a connected motor and including washer apparatus having a delivery nozzle the combination comprising a pump for delivering fluid through said nozzle, said pump comprising a low volume pump chamber and a low displacement piston reciprocable therein and a unitary control, said unitary control including a pump actuator and a motor actuator, means for manually actuating said pump actuator and said motor actuator conjointly to eject a measured volume of fluid through said nozzle and to energize said motor and a dual function force multiplying lever operatively connecting said pump actuator and said piston for transmitting applied forces between said pump actuator and said piston.

3. In a windshield cleaning system including a wiping element and a connected motor and including washer apparatus having a delivery nozzle; a servo-system comprising a high pressure capacity pump constituting a servo-mechanism for delivering fluid through said nozzle, said pump comprising a pump chamber and a low displacement fluid displacing element reciprocable therein, a control, said control including a servo-actuator and a motor actuator, means for manually actuating said servo-actuator and said motor actuator conjointly to eject fluid through said nozzle at operator controlled pressure and to energize said motor, a dual function force transmitting lever operatively connecting said servo-actuator and said fluid displacing element for transmitting applied forces between said servo-actuator and said fluid displacing element, plural acting biasing means acting through said force transmitting lever for automatically resetting said servo-actuator, for automatically recharging said pump chamber and for moderating manual force applied to said fluid displacing element, said motor actuator being operable independently of said servo-actuator.

4. In a windshield cleaning system including a wiping element and a connected motor and including washer apparatus having a delivery nozzle; a unitized servo-system comprising a control having a pump mounted thereon for delivering fluid through said nozzle, said pump constituting a servo-mechanism comprising a pump chamber having a low displacement fluid displacing element reciprocable therein, said control including a servo-actuator and a motor actuator, means for manually actuating said servo-actuator and said motor actuator conjointly to eject a single measured increment of fluid through said nozzle at operator controlled pressure and to energize said motor, a dual function force transmitting lever operatively connecting said servo-actuator and said fluid displacing element for transmitting applied forces between said servo-actuator and said fluid displacing element, plural acting biasing means acting through said force transmitting lever for automatically resetting said servo-actuator, for automatically recharging said pump chamber and for moderating manual force applied to said fluid displacing element, and said motor actuator being operable independently of said servo-actuator and means for actuating said servo-actuator at operator selected intervals and operator controlled pressure independently of said motor actuator to deliver operator controlled increments of solvent when said motor actuator is in the motor energizing position.

5. In a windshield cleaning system including a wiping element and a connected motor and including washer apparatus having a delivery nozzle; the combination comprising a low volume, high pressure pump for delivering fluid through said nozzle, said pump comprising a pump chamber and a piston reciprocable therein and a combined manual pump and motor control, said combined pump and motor control and said pump forming a unitized assembly, said combined pump and motor control including a pump actuator and a motor actuator, means for manually actuating said pump actuator and said motor actutor conjointly to eject fluid through said nozzle and to energize said motor, a dual function force multiplying lever operatively connecting said pump actuator and said piston for transmitting applied forces between said pump actuator and said piston and plural acting biasing means acting through said force multiplying lever for automatically resetting said pump actuator, for automatically recharging said pump chamber and for moderating manual force applied to said piston.

6. In a windshield cleaning system including a wiping element and a connected motor and including washer apparatus having a delivery nozzle; a servo-system comprising a servo-mechanism for delivering solvent through said nozzle, said servo-mechanism comprising a pump chamber and a low displacement reciprocating pumping element and a unitized control including a pumping element servo-actuator and a motor actuator and means for manually actuating said pumping element actuator and said motor actuator conjointly to eject fluid through said nozzle and to energize said motor; said unitized control, said servo-mechanism and said means, together, forming a unitary structure; and a dual function force multiplying lever operatively connecting said pumping element servo-actuator and said pumping element for transmitting applied forces between said pumping element servo-actuator and said pumping element.

7. In a windshield cleaning system including a wiping element and a connected motor and including washer apparatus having a delivery nozzle; a servo-system comprising a servo-mechanism for delivering solvent through said nozzle, said servo-mechanism comprising a solvent chamber and a reciprocating fluid displacing element and a unitized control including a fluid displacing element actuator and a motor actuator and means for manually actuating said fluid displacing element actuator and said motor actuator conjointly to eject fluid through said nozzle and to energize said motor; said control, said servo-mechanism and said means together forming a unitary structure; and a dual function force multiplying lever operatively connecting said fluid displacing element actuator and said fluid displacing element for transmitting applied forces between said fluid displacing element actuator and said pumping element and plural acting biasing means acting through said force multiplying lever for automatically resetting said fluid displacing element actuator, for automatically recharging said solvent chamber and for moderating manual force applied to said fluid displacing element.

8. In a windshield cleaning system including a wiping element and a connected motor and including washer apparatus having a delivery nozzle; a servo-system comprising a low volume, high pressure pump constituting a servo-mechanism for delivering solvent through said nozzle, said servo-mechanism comprising a solvent chamber and a low displacement reciprocating pumping element disposed therein and a unitized control including a servo-actuator and a motor actuator and means for manually actuating said servo-actuator and said motor actuator conjointly to eject a single measure increment of solvent through said nozzle and to energize said motor; said servo-mechanism, said control and said means together forming a unitary structure; and a dual function force multiplying lever operatively connecting said servo-actuator and said pumping element for transmitting applied forces between said servo actuator and said pumping element and plural acting biasing means acting through said force multiplying lever for automatically resetting said servo-actuator, for automatically recharging said solvent chamber and for moderating manual force applied to said pumping element and means for manually actuating said motor actuator independently of said servo-actuator to energize and deenergize said motor.

9. In a windshield cleaning system including a wiping element and a connected motor and including washer apparatus having a delivery nozzle; a servo-system comprising a low volume, high pressure pump constituting a servo-mechanism for delivering solvent through said nozzle, said pump comprising a solvent chamber and a low displacement fluid displacing element and a control including a servo-actuator and a motor actuator and means for manually actuating said servo-actuator and said motor actuator conjointly to eject a single measured increment of solvent through said nozzle and to energize said motor; said servo-mechanism, said control and said means together forming a unitary structure; and a dual function force multiplying lever operatively connecting said servo-actuator and said fluid displacing element for transmitting applied forces between said servo-mechanism and said fluid displacing element and plural acting biasing means acting through said force multiplying lever for automatically resetting said servo-actuator, for automatically recharging said solvent chamber and for moderating manual force applied to said fluid displacing element and means for manually actuating said motor actuator independently of said servo-actuator to energize and deenergize said motor and means for actuating said servo-actuator independently of said motor actuator to deliver repeated increments of solvent at operator controlled intervals and at operator controlled pressures when said motor actuator is in the motor energizing position.

10. In a windshield cleaning system including a wiping element and a connected motor and including washer apparatus having a delivery nozzle; a servo-system comprising a servo-mechanism for delivering solvent through said nozzle, said servo-mechanism comprising a solvent chamber and a fluid displacing element disposed therein, a control including a servo-actuator and a motor actuator telescopically and coaxially disposed for axial movement relative to each other, means for manually actuating said servo-actuator and said motor actuator axially and conjointly in a direction to eject fluid through said nozzle and to energize said motor, means to actuate said motor actuator axially in either one of two directions independently of said servo-actuator to, respectively, energize and deenergize said motor and means to operate said servo-actuator axially to eject solvent through said nozzle at operator controlled intervals independently of said motor actuator when said motor actuator is in a position to energize said motor and a dual function force multiplying lever operatively connecting said fluid displacing element for transmitting applied forces between said servo-actuator and said fluid displacing element.

11. In a windshield cleaning system including a wiping element and a connected motor and including washer apparatus having a delivery nozzle; the combination comprising a pump for delivering solvent through said nozzle, said pump comprising a pump chamber and a reciprocating pumping element, a combined manual pump control and motor control, said pump control and motor control including a pump actuator and a motor actuator coaxially disposed for axial movement relative to each other, means for manually actuating said pump actuator and said motor actuator axially and conjointly in a direction to eject fluid through said nozzle and to energize said motor, means for effecting a time delay between initial pump operation and subsequent conjoint operation, means to actuate said motor actuator axially in either one of two directions independently of said pump actuator to, respectively, energize and deenergize said motor and means to operate said pump actuator axially to eject solvent through said nozzle independently of said motor actuator when said motor actuator is in a position to energize said motor and a dual function force transmitting lever operatively connecting said pumping element and said pump actuator for transmitting applied forces between said pump actuator and said pumping element.

12. In a windshield cleaning system including a wiping element and a connected motor and including washer apparatus having a delivery nozzle; the combination comprising a pump for delivering solvent through said nozzle, said pump comprising a pump chamber and a reciprocating pumping element, a combined manual pump control and motor control, said combined pump control and motor control including a pump actuator and a motor actuator coaxially disposed for axial movement relative to each other, means for manually actuating said pump actuator and said motor actuator axially and conjointly in a direction to eject fluid through said nozzle and to energize said motor, means for effecting a time delay between initial pump operation and subsequent conjoint operation, means to actuate said motor actuator axially in either one of two directions independently of said pump actuator to, respectively, energize and deenergize said motor and a dual function force transmitting lever operatively connecting said pumping element and said pump actuator for transmitting applied forces between said pump actuator and said pumping element.

13. In a windshield cleaning system including a wiping element and a connected motor and including washer apparatus having a delivery nozzle; the combination comprising a pump for delivering solvent through said nozzle, said pump comprising a pump chamber and a reciprocating pumping element, a combined manual pump control and motor control, said pump control and motor control including a pump actuator and a motor actuator coaixally disposed for axial movement relative to each other, means for manually actuating said pump actuator and said motor actuator axially and conjointly in a direction to eject fluid through said nozzle and to energize said motor, means for effecting a time delay between initial pump operation and subsequent conjoint operation, means to actuate said motor actuator axially in either one of two directions independently of said pump actuator to, respectively, energize and deenergize said motor, a dual function force transmitting lever operatively connecting said pumping element and said pump actuator for transmitting applied forces between said pump actuator and said pumping element and plural acting biasing means acting through said force transmitting lever for automatically resetting said pump actuator, for automatically recharging said pump chamber and for moderating manual force applied to said pumping element.

14. A windshield cleaning system comprising a wiper element, a motor connected thereto for operating the same, washer apparatus comprising a pump having a solvent chamber and a fluid displacing element reciprocable therein, said fluid displacing element being operable in one direction of travel to eject solvent onto a windshield and being operable in the opposite direction of travel to charge said solvent chamber with solvent from a reservoir, an axially reciprocable manual pump actuator, a first dual acting force transmitting lever for operatively connecting said pump actuator to said fluid displacing element whereby movement of said pump actuator in a first axial direction acting through said force transmitting lever moves said fluid displacing element in said one direction and movement of said pump actuator in a second axial direction opposite to said first axial direction moves said fluid displacing element in said opposite direction, plural function biasing means for moving said fluid displacing element in said opposite direction of travel, for moving said manual pump actuator in said second axial direction, and for moderating manual force applied to said pump actuator, an axially reciprocable manual wiper motor actuator operable to start said wiper motor when at one terminus of its axially reciprocal movement and operable to stop said wiper motor at the other terminus of its axially reciprocal movement and means interconnecting said manual pump actuator and said manual wiper motor actuator for conjoint axial movement when said actuator is moved in said one direction to thereby move said wiper motor actuator to said one terminus.

15. In a windshield cleaner comprising a wiper system including a wiper blade and a wiper motor and a washer system comprising a delivery nozzle and a connected pump; the combination comprising a manual motor control, a manual pump control, and a reciprocating piston for said pump, a plural acting, force transmitting lever connecting said manual pump control and said piston, a dual acting biasing means for simultaneously recharging said pump directly and for resetting said manual control through said force transmitting lever and means for effecting delayed conjoint movement of said manual motor control with said manual pump control when said manual pump control is actuated to cause a solvent ejection, said manual motor control being manually actuatable axially in two directions independent of said manual pump control.

16. A windshield cleaner comprising a wiper system including a wiping blade and a connected motor with a manual motor control responsive to manual axial movement in two directions, a washer system including a delivery nozzle, a connected pump having a reciprocating piston and a manual pump control, a plural acting force transmitting lever connecting said manual pump control and said piston, a dual acting biasing means for recharging said pump directly and for resetting said manual control through said lever, and means for effecting conjoint operation of said manual pump control and said manual motor control when said manual pump control is actuated to eject solvent.

References Cited by the Examiner

UNITED STATES PATENTS 2,856,626   10/58   Marte _____ 15—250.02
2,992,448    7/61   Simpson _____ 15—250.02

CHARLES A. WILLMUTH, *Primary Examiner.*